United States Patent [19]
Cain et al.

[11] 3,815,919
[45] June 11, 1974

[54] EDUCATIONAL BOARD GAME APPARATUS

[76] Inventors: Diana K. Cain, 16 East Dr.; Linda L. Morgason, 14 East Dr., Burlington Park, both of Muncie, Ind. 47302

[22] Filed: July 31, 1972

[21] Appl. No.: 276,316

[52] U.S. Cl. ... 273/134 AD, 273/134 C, 273/134 D
[51] Int. Cl. .............................................. A63f 3/00
[58] Field of Search .................................... 273/134

[56] References Cited
UNITED STATES PATENTS
2,852,260  9/1958  Caffrey ..................... 273/134 AD
3,124,358  3/1964  Weedman .................. 273/134 C FOREIGN PATENTS OR APPLICATIONS
456,259  5/1949  Canada ..................... 273/134 AD

*Primary Examiner*—Delbert B. Lowe

[57] ABSTRACT

A game device comprising a game board having first indicia defining a pathway and second indicia dividing the pathway into a multiplicity of adjoining segments. Also provided are a plurality of decks of cards, each of the cards having thereon a problem situation and a plurality of alternative solutions to the problem. Also provided is a chart having indicia and a second plurality of decks of cards associated therewith for determining the amount and direction of movement of playing pieces on the pathway. A plurality of indicia are provided for associating each of the segments with the first mentioned plurality of decks of cards and for associating the alternative solutions with movement instructions.

9 Claims, 5 Drawing Figures

PATENTED JUN 11 1974 3,815,919
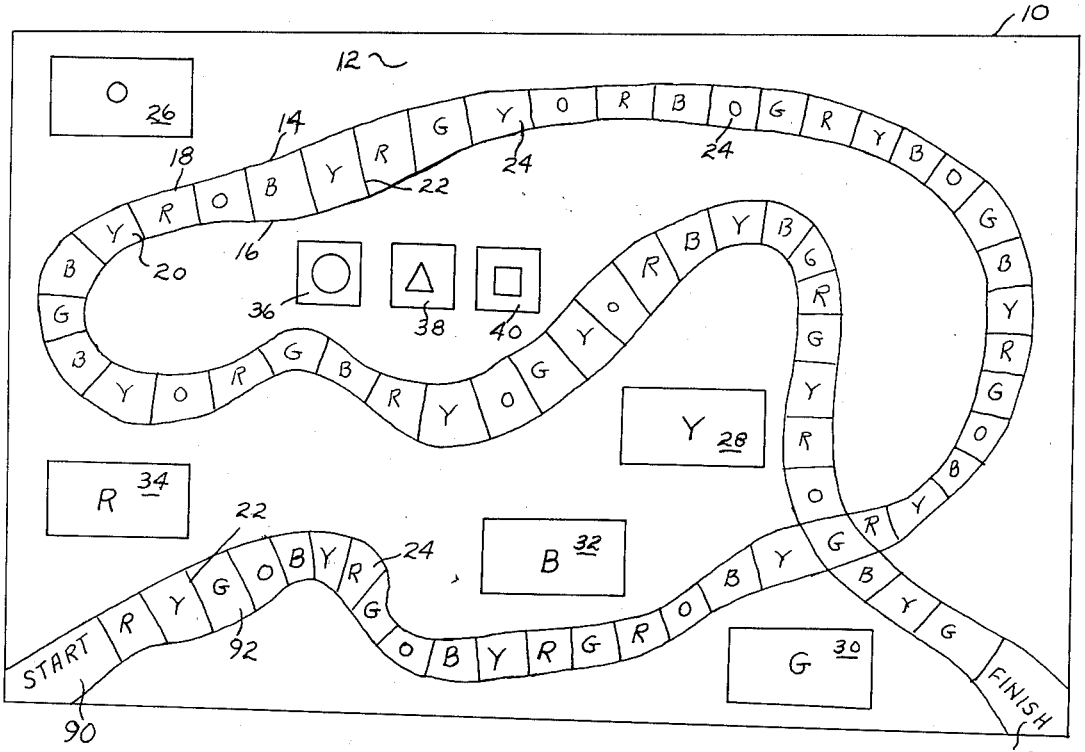
Fig. 1
Fig. 2
One of your classmates is fat, you would:
A. Laugh at him and call him "fatty."
B. Be a friend to him because both of you enjoy drawing.
C. Not be his friend and not laugh at him and not call him "fatty."
5
Fig. 3
| | Red | Yellow | Blue | Orange | Green |
|---|---|---|---|---|---|
| 1 | A B C<br>△ □ ○ | A B C<br>□ ○ △ | - - - | - - - | - - C<br>- - △ |
| 2 | A - -<br>○ - - | - 70 - | - - - | - - - | A B C<br>△ ○ □ |
| 3 | A B C<br>○ △ □ | - 72 - | - - - | - - - | - - - |
| 4 | A B -<br>□ △ - | - 70 - | - - - | - - - | - - - |
| 5 | A B C<br>○ △ □ | - - - | - - - | - - - | A B C<br>△ □ ○ |
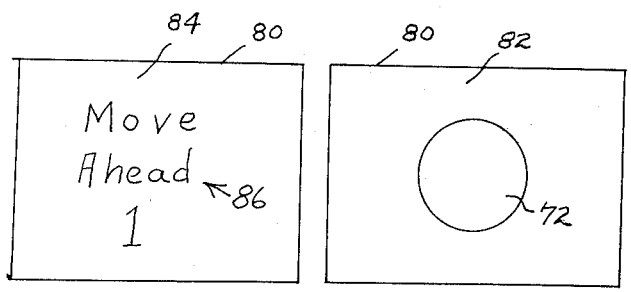
Fig. 4a — Move Ahead 1
Fig. 4b

EDUCATIONAL BOARD GAME APPARATUS

BACKGROUND OF THE INVENTION

1. Field of the Invention

The present invention relates to games for elementary school children and in particular to such a game wherein movement of playing pieces on a playing board is determined by the players' response to problems presented to the players in the course of playing the same.

2. Description of the Prior Art

Teaching social values such as cooperation, honesty, respect for others, determination, and the like, is an essential part of elementary education. To be effective, methods for teaching such social values are preferably adapted to be entertaining and enjoyable for the children.

Correlative to teaching such values, it is important for a teacher to be able to test and otherwise evaluate the social value development of the students. Preferably, such testing should be done in a manner and by a means whereby the student is not directly confronted with a test situation, whereby the student will respond normally. Preferably, such a testing technique should be performed in a manner such that the students are totally unaware that they are being tested at all.

SUMMARY OF THE INVENTION

Broadly, the present invention is a game which may be used both as a means for teaching social values to elementary school children and/or as a means of testing the social development of such children. To this end, the invention is a game adapted to be played by elementary children, children the game being competitive and enjoyable and wherein the students, in accordance with the rules of the game, advance playing pieces on a playing board with the first player who moves his playing piece from one end of the playing board to the other in accordance with the rules being the winner. Movement of the playing pieces is governed by means of situations or problems presented to the players by means of a plurality of decks of cards with the cards being selected by means of various indicia on the playing board and the cards. Answers or solution alternatives are also presented on the cards and a master chart is provided, there being indicia on the cards and the chart for associating the selected answers with indicia of the chart. The answers are weighted in accordance with a "good," "neutral," or "bad" system whereby a player will advance, remain stationary, or move backwardly on the playing board in accordance with this answer. Since the situations and alternative solutions are weighted and the movement of the playing pieces is determined solely by the answer of the player, the movement of the players on the board is determined primarily by their social development, rather than by chance.

In an embodiment of the invention the game comprises a game board having thereon first indicia means for defining a pathway on the playing board and second indicia means for dividing the pathway into a multiplicity of adjoining segments. A plurality of playing pieces are provided and are selectively movable along the pathway. A first plurality of decks of cards, each card having thereon a problem and a plurality of alternative solutions to the problem also are provided. A master chart, and a third indicia means on the aforementioned segments and on each of the decks and on the master chart, are provided for associating each segment with a predetermined one of the decks. Fourth and fifth indicia means are provided on the cards and chart which cooperate with the third indicia means thereon for associating each of the alternative solutions on the cards with predetermined ones of a sixth indicia means on the chart, there being a different one of said sixth indicia for each of the aforementioned alternative solutions on each card. The sixth indicia correlate with similar sixth indicia on a second plurality of decks of cards for specifying the movement of the pieces. A plurality of players, each being assigned a predetermined one of the playing pieces, positions his piece on a predetermined one of the segments adjacent one end of the pathway. Taking turns, a player draws a card from the deck associated with the last mentioned segment by means of the third indicia, and, in response to the problem thereon, selects one of the alternatives on the selected card. Referring to the chart, the player, or, in the alternative, the supervisor, determines a corresponding fifth indicia on the chart and the sixth indicia on the chart associated with the determined fifth indicia. The sixth indicia determines the selection of a card from one of said second plurality of decks of cards which indicate the proper move for the player's pieces. The first player moving his piece from the predetermined segment to the distal end of the pathway is determined as the winner.

In use, the players, typically elementary school children, are taught that the selection of desirable social attitudes produces a positive progress and are thereby induced to adopt such principles. Simultaneously, a teacher, by recording the responses of the children to the problem situations, is able to acquire relevant data on the child's social development and to determine any problems the child may be having therewith. Such information is invaluable in assisting the teacher to help the individual children in their social development.

Simultaneously, it will be apparent that, because of the enjoyable nature of the game, children will be provided with a pleasurable experience while at the same time being guided in the social development. The children will not be aware or any testing situation and by simply recording the children's response to the game situation, the teacher is provided with valuable test information which is obtained from the children under a relaxed, non-test atmosphere.

It is therefore an object of the invention to provide an educational game for elementary school children.

It is another object of the invention to provide such a game which makes it enjoyable for children to learn social values.

It is still another object of the invention to provide such a game which can be used to evaluate the social development of elementary school children.

It is yet another object of the invention to provide a social development game wherein the progress of the playing pieces on the playing board is determined by use of weighted social development questions.

Another object of the invention is to provide a social development game which does not rely solely upon chance.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a top plan view of the game board of the present invention;

FIG. 2 is an illustration of a typical card in one of the first plurality of decks of cards;

FIG. 3 is a typical chart for use in the invention; and

FIGS. 4a and 4b are illustrations of the back and front sides, respectively, of one of the cards of the second plurality of decks of cards.

DESCRIPTION OF A SPECIFIC EMBODIMENT

Referring now to the drawings, there is shown in FIG. 1 a game board 10 for use in the invention, which comprises a flat surface which may be made of stiff cardboard, wood, or the like, and having a planar playing surface 12. Formed on surface 12 is a first indicia 14 comprising a pair of generally parallel lines 16 and 18 which define therebetween a serpentine path 20.

Second indicia means 22 are provided, dividing the path 20 into a multiplicity of adjoining segments 24. The segments 24 may be differently colored for eye appeal to small children. In a specific embodiment, the segments 24 may assume one of the five colors, red, yellow, green, orange, and blue, denoted by capital letters R, Y, G, O, and B, respectively, with the differently colored segments 24 occurring randomly in sequence in about equal numbers.

Also provided on playing surface 12 are a plurality of areas on each of which is placed one of a first plurality of decks of cards 26, 28, 30, 32, and 34. Also provided on playing surface 12 are three areas on each of which is placed a respective one of a second plurality of decks of cards 36, 38 and 40. Each of decks 26 through 34 comprises a multiplicity of cards adapted to be neatly stacked. The cards of each deck 26 through 34 are further provided with a third indicia which associates each of the cards of the respective decks 26 through 34 with a respective one of the segments 24. For example, if the segments 24 are the colors red, yellow, green, orange and blue, the cards in the deck 26 may all be colored orange to thereby be associated with the orange segments 24 of path 20, the cards of deck 28 may be colored yellow to thereby be associated with the yellow segments 24 of path 20, the cards of deck 30 may all be colored green to thereby be associated with all of the green segments 24 of path 20 and so forth.

On the back of each card of each deck there is printed a social problem situation as at 44 and fourth indicia 45. Referring to FIG. 2, there is illustrated a card 42 setting forth an example of a problem situation 44. The problem situation may state a problem such as "You ripped your clothes. When you go home, you would:." Following the problem situation 44, there are printed three answers or alternative solutions 46 to the problem situation 44. Each of the alternative solutions 46 relates to the problem situation presented and each of the alternative solutions is preceded by a fifth indicium 47. In the example illustrated, these fifth indicia comprise the capital letters "A," "B," and "C," each of which denotes one of the alternative solutions 46.

Referring now to FIG. 3, there is shown a typical chart 54 for use with the game board 10. The chart 54 is in tubular form and includes a plurality of columns 56, 58, 60, 62, and 64. Each of the columns 56 through 64 is identified by a predetermined one of the third indicia used to identify segments 24, i.e., the colors red, yellow, blue, orange, and green or the words "red," "yellow," "blue," "orange," and "green," and correspondingly, is associated thereby with a predetermined one of decks 26 through 34. The chart 54 is further divided into horizontal rows 49 identified by the fourth indicia 45 appearing on cards 42, these indicia being for example the numbers "1," "2," "3," "4," and "5." In each column 56 through 64 of each of rows 49, indicia 47 associated with each of the alternative solutions 46 are again printed at at 70. Beneath each of the indicia at 70 is printed a sixth indicia as at 72. Indicia 72 may be in the form of numbers or, as illustrated, may be in the form of three geometric figures, namely a "circle," a "triangle," and a "square." It will be observed that there is one circle, one triangle and one square in eachow 49 of each column 56 through 64. The indicia at 70 cooperate with indicia 56 through 64 and 45 to correlate each solution 46 via indicia 72 to that one of the decks 36, 38, 40 having movement instructions appropriate to the selected solution 46.

Referring now to FIGS. 4a and 4b, there is illustrated a typical card 80 of one of the decks 36 through 40, each of cards 80 having a front face 82 (FIG. 4b), and a back face 84 (FIG. 4a). On front face 82 indicia 72 appearing on chart 54 are repeated with all of the cards of deck 36 having the same one of the indicia 72 thereon, all of the cards of deck 38 having a second one of the indicia 72 thereon and all of the cards of deck 40 having the remaining one of the indicia 72 thereon. Stated otherwise, all of the cards of deck 36 are marked on their face 82 with a circle, all of the cards of deck 38 are marked on their face 82 with a triangle and all of the cards of deck 40 are marked on their face with a square.

On the back face 84 of each of the cards 80 of decks 36 through 40 are printed instructions giving the players the distance and direction they are to move their playing piece.

Preferably, a conventional die as used in the game of dice is also provided for use with the game but is not shown. A plurality of playing pieces, also not shown, are provided, there being one playing piece or marker for each player playing the game in conventional manner.

The theory of the game is as follows. Each player places his moving piece on start area 90. Each player in turn throws the die and moves his moving piece a number of segments 24 equal to the number appearing on the thrown die. The first player then draws a card from the appropriate one of decks 26 through 34 which corresponds to the third indicia of the segment on which his moving piece has landed. For example, if the first player cast the number three with the die, his moving piece will be on segment 92 which is denoted by the third indicia, the color grren. The first player would then draw the top card from deck 30. The player then reads the problem situation on the card and selects what he believes to be the most suitable of the alternative solutions 46 printed thereon. Using the illustrated card 42 as an example, and assuming that the first player selects answer "C" the player or, in the alternative, the teacher or other supervisor, will refer to chart 54. The card is the third indicia color green thereby directing the player or teacher to column 64. The fourth indicia is the number 5 thereby referring the player or teacher to row five. The selected alternative solution is "C." Therefore, referring to column 64, row five, the player or teacher will find a sixth indicia of a circle under the fifth indicia "C." The player then draws the top card from deck 36 the cards of which are denoted by a circle. Upon reading the back side of the card the player finds that he is instructed to move ahead one space.

This same procedure is followed in turn by each of the other players in the game. The game continues until one of the players has moved his moving piece the full length of path 20 and reaches the finish area 94.

Preferably, the cards of each of decks 26 through 34 have printed thereon social problem situations of a similar nature. For example, all of the cards in deck 26 may present problem situations dealing with honesty, all of the cards in deck 28 may present social problem situations dealing with perseverance, all of the cards in deck 30 will contain social problem situations dealing with cooperation, etc. The chart 54 will be observed to associate each of the offered alternative solutions with one of the decks 36 through 40. Each of the cards in deck 36 contains about equally weighted move instructions. Similarly, all of the cards in deck 38, and all of the cards in deck 40 are provided with essentially equal weight move instructions. For example, all of the cards in deck 36 will contain instructions to move the playing piece ahead one space, back one space, or to leave the playing piece at its then present position. All of the cards in deck 38 would contain instructions to move the playing piece forward a substantial number of spaces such as, for example, four, five, or six spaces. All of the cards in deck 40 would contain instructions to move the playing piece back a substantial number of spaces.

Correspondingly, each of the alternative solutions on each of the cards of decks 26 through 34 are similarly weighted. One alternative solution would be a favorable or desirable answer. A second alternative would correspond to a neutral or "not good" or "not bad," and the third alternative solution would correspond to a poor or negative answer to the situation. Thus, by correlating the third through sixth indicia by means of chart 54, the player's selection of the answer to each social problem situation will produce a corresponding move instruction for his playing piece with the direction and amount of the move being related to the correctness or desirability of his selected solution.

Variations of the game will of course be apparent. The various forms of indicia which have been illustrated may be replaced with other similar suitable indicia. Colors, for example, could be shapes. The path could be formed as a plurality of non-connected spaces, and the like. Further, it will be apparent to those skilled in the art that problem situations could also be presented in the form of pictures, that is, a picture of a problem situation may be printed on the cards 42 with pictures of alternative solutions to the problem being also printed on the cards. In this form, the game could also be used for children who have not yet been taught to read.

It will be seen that the game of the present invention can be used both as an entertaining way to teach social values to elementary school children by impressing upon them that there is good in selecting a good answer and bad in a bad answer. It will further be apparent that the game of the present invention can be used to test the social development of children by simply recording the answers selected by the individual players during the course of the game. In this latter event, the players will typically be unaware that they are being tested and will respond normally.

While there have been described above the principles of this invention in connection with specific apparatus, it is to be clearly understood that this description is made only by way of example and not as a limitation to the scope of the invention.

What is claimed is:

1. A game device comprising a game board having thereon first indicia defining a pathway and second indicia dividing said pathway into a multiplicity of adjoining path segments, a plurality of playing pieces selectively movable along said path, a first plurality of decks of cards, each card thereof having printed thereon a problem and a plurality of alternative solutions to said problem, each of said segments and each of said first decks of cards having thereon a predetermined one of a plurality of third indicia thereby associating each of said segment with a predetermined one of said first decks, a plurality of fourth and a plurality of fifth indicia on said cards of said first decks, there being a predetermined different one of said fourth indicia on each card of said first decks of cards, and a predetermined different one of said fifth indicia on each card of said first decks of cards associated with each said alternative solution thereon, a master chart having thereon a multiplicity of groups of sixth indicia and said third, fourth, and fifth indicia, said third, fourth, fifth, and sixth indicia being arranged on said chart to associate each one of each group of said sixth indicia with a different predetermined combination of said third, fourth, and fifth indicia, and a second plurality of decks of cards, the cards of each of said second deck having instructions on one face thereof specifying the movement of said pieces, there being a predetermined one of said sixth indicia on the opposite face of all of the cards of each said second deck.

2. The game device of claim 1 further including a random number selector

3. The device of claim 2 wherein said pathway includes a first segment at one end thereof designated a "start" segment and another segment at the opposite end of said path designated as a "finish" segment.

4. The game device of claim 3 wherein said pathway is serpentine, said third indicia are colors, the number of different colors of said segments being equal to the number of said first decks of cards, said fourth indicia are Arabic numerals on each card of each of said first decks, and said fifth indicia are characters of the alphabet.

5. The game device of claim 4 wherein said groups of sixth indicia are arranged on said chart in columns and rows, each said column having thereon a different one of said third indicia, each said row on said chart having thereon a different predetermined one of said fourth indicia, there being one each of said fifth indicia in each of said columns in each said rows.

6. The game device of claim 5 wherein said sixth indicia comprise a plurality of differently shaped geometric figures, said second plurality of decks having on all of the cards of each deck a predetermined one of said figures.

7. The game device of claim 1 wherein each said problem is a social problem, said alternative solutions being courses of conduct responsive to said social problem.

8. The game device of claim 7 wherein said social problems are problems dealing with honesty, cooperation, perseverance, and friendship, said alternative solutions being statements of a desirable, a neutral, and an undesirable response to said social problems.

9. The game device of claim 1 wherein the number of different indicia of said plurality of third, fourth, and fifth indicia are equal to the number of said first decks of cards, the number of cards in each of said first decks of cards, and the number of alternative solutions on each card of said first decks of cards, respectively, the number of said groups of sixth indicia being equal to the number of combinations of said third and fourth indicia.

* * * * *

UNITED STATES PATENT OFFICE
CERTIFICATE OF CORRECTION

Patent No. 3,815,919          Dated June 11, 1974

Inventor(s) Diana K. Cain & Linda L. Morgason

It is certified that error appears in the above-identified patent and that said Letters Patent are hereby corrected as shown below:

In the Specification

Column 1, line 10; change "same" to -- game --.

Column 1, lines 34 and 35; after "elementary" insert --school--.

Column 1, line 35; after "children", first occurrence, delete "children".

Column 2, line 2; change "are" to -- is --.

Column 2, line 10; after "with" insert -- a --.

Column 3, line 67; change "tubular" to -- tabular --.

Column 4, line 13; change "at", first occurrence, to -- as --.

Column 4, line 19; change "eachow" to -- each row --.

Column 4, line 58; change "grren" to -- green --.

Signed and Sealed this

Twenty-seventh Day of July 1976

[SEAL]

Attest:

RUTH C. MASON
*Attesting Officer*

C. MARSHALL DANN
*Commissioner of Patents and Trademarks*